United States Patent [19]

Greenlaw

[11] Patent Number: 4,516,660
[45] Date of Patent: May 14, 1985

[54] EJECTOR AND METHOD FOR CONTROLLING JET ENGINE NOISE

[76] Inventor: Alfred L. Greenlaw, 12017 210th Pl. Southeast, Issaquah, Wash. 98027

[21] Appl. No.: 475,711

[22] Filed: Mar. 14, 1983

Related U.S. Application Data

[63] Continuation of Ser. No. 189,105, Sep. 22, 1980, abandoned.

[51] Int. Cl.³ .................... G10K 11/00; B63H 25/46
[52] U.S. Cl. .................... 181/296; 181/215; 181/220; 239/265.17; 239/265.19; 239/265.33
[58] Field of Search .................. 181/213–222, 181/296; 239/1, 8, 127.3, 265.17, 265.19, 265.13, 265.27, 265.29, 265.31, 265.33, 127.1, 127.3, ; 60/230, 263, 264, 269, 284, 262

[56] References Cited

U.S. PATENT DOCUMENTS

| | | | |
|---|---|---|---|
| 3,065,818 | 11/1962 | Lombard et al. | 181/213 |
| 3,391,869 | 9/1968 | Glass | 239/265.19 |
| 3,525,474 | 8/1970 | Von Ohain et al. | 239/265.17 |
| 3,667,680 | 6/1972 | Weed | 181/215 X |
| 3,695,387 | 10/1972 | Hilbig | 181/219 |
| 3,710,890 | 1/1973 | True et al. | 181/215 |
| 3,721,314 | 3/1973 | Hoch et al. | 181/215 |
| 3,737,005 | 6/1973 | Tontina | 181/216 |
| 3,749,316 | 7/1973 | Tontina | 181/215 X |
| 3,820,630 | 6/1974 | Huff | 181/213 |
| 3,954,224 | 5/1976 | Colebrook et al. | 181/213 X |
| 4,077,206 | 3/1978 | Ayyagari | 181/220 X |
| 4,117,671 | 10/1978 | Neal et al. | 60/262 |
| 4,137,992 | 2/1979 | Herman | 181/213 |
| 4,149,375 | 4/1979 | Wynosky et al. | 181/220 X |
| 4,165,609 | 8/1979 | Rudolph | 181/213 X |
| 4,175,640 | 11/1979 | Birch et al. | 181/213 |

Primary Examiner—Benjamin R. Fuller
Attorney, Agent, or Firm—Seed and Berry

[57] ABSTRACT

An ejector and method of reducing jet engine noise are disclosed wherein the primary combustion gas stream of the jet engine is ejected into a mixing section or zone of the ejector and into which a secondary gas stream is also injected at a velocity sufficient to create a choked or Mach 1.0 mixed flow condition, resulting in rapid mixing of the primary and secondary gas streams in the mixing zone. A diffuser is connected to the ejector downstream from the mixing zone for pulling the mixed gas stream through the mixing zone. The diffuser has an exit area greater than the area of the mixing zone. The ejector is provided with means for adjusting the area of the mixing section or zone and diffusion section to match engine operating conditions so as to create proper conditions within the mixing zone for noise suppression. Noise suppression by the method and means disclosed occurs at all frequencies with a minimal loss of thrust, and possibly a slight gain.

3 Claims, 8 Drawing Figures

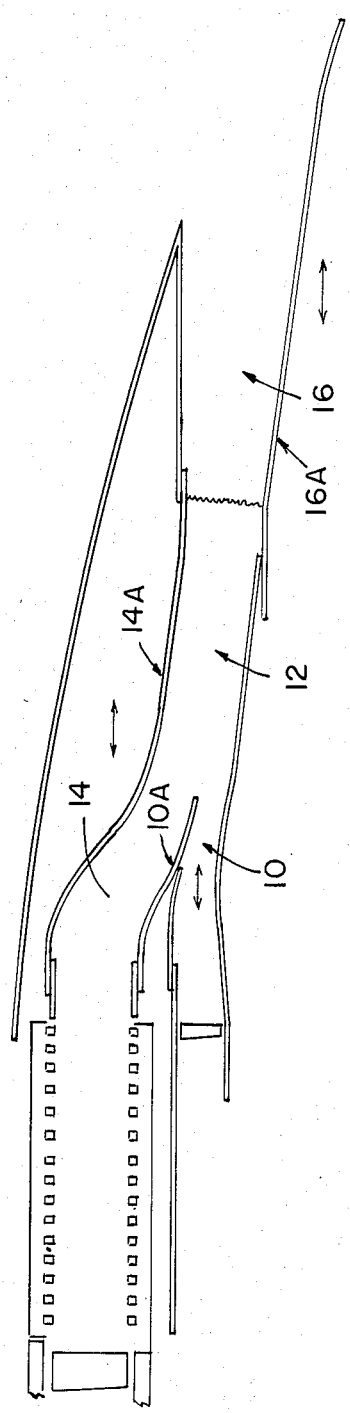
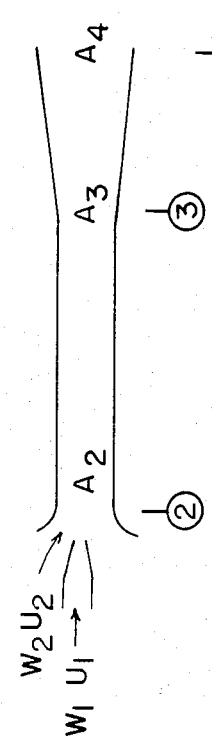
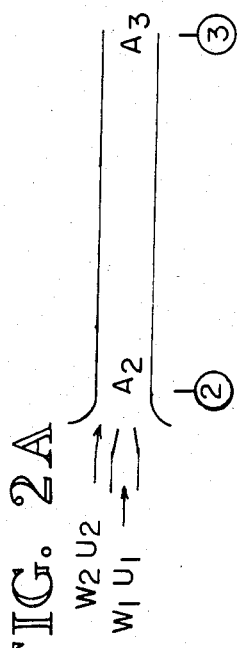
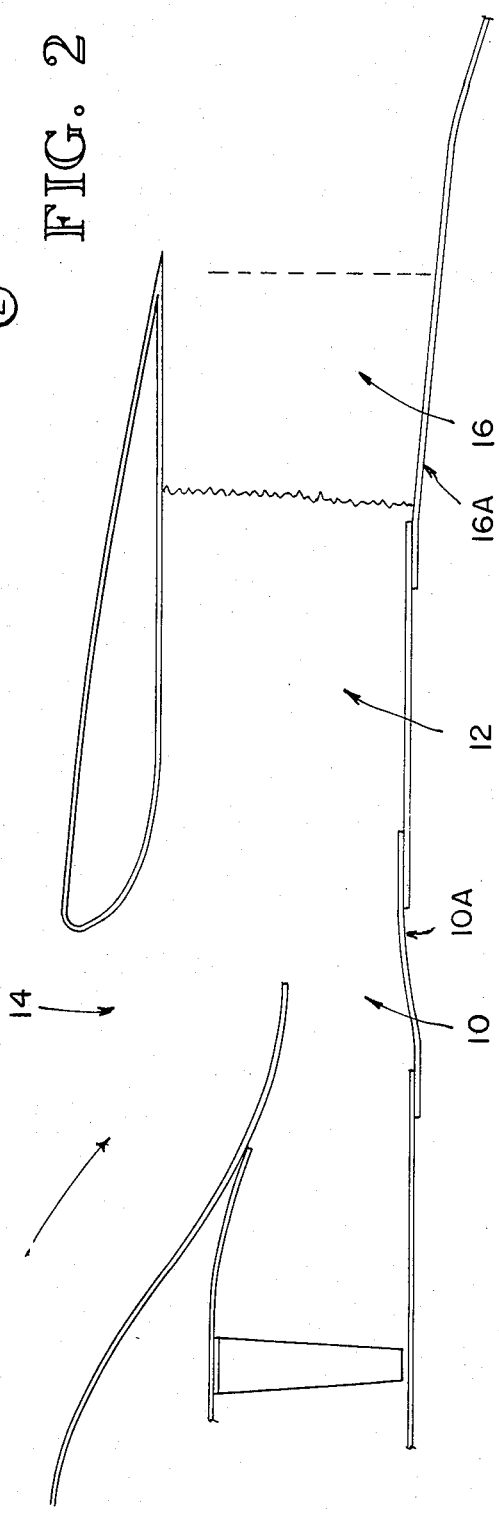

V = SPEC. VOL. FT³/LB
M = MACH NO.
☐ = M₃ = 1.0

V = SPEC. VOL. FT³/LB
M = MACH NO.
☐ = M₃ = 1.0

M = MACH NO.
☐ = M₃ = 1

M = MACH NO.
☐ = M₃ = 1

EJECTOR AND METHOD FOR CONTROLLING JET ENGINE NOISE

This application is a continuation of U.S. patent application Ser. No. 189,105, filed Sept. 22, 1980, now abandoned under C.R.F. § 1.62.

BACKGROUND OF THE INVENTION

1. Field of the Invention

This invention relates to a method of suppressing jet engine noise and an ejector system therefor.

2. Prior Art Relating to the Disclosure

A great deal of effort has been expended to develop a practical and economical method of suppressing "jet noise" caused by the shearing action of the high-velocity combustion exhaust gases acting on the surrounding ambient atmosphere on their discharge. While one can suppress jet noise by reducing the velocity of the exhaust gas steam, this also means a reduction in engine thrust unless the mass is increased to compensate for the reduction in the velocity of the exhaust gas steam. The following patents illustrate and describe various ejector systems for attenuating and reducing jet engine noise.

U.S. Pat. No. 3,710,890 describes an exhaust nozzle systyem for suppressing jet engine noise wherein the exhaust flow of the engine is ducted into the inside of a series of corrugated, fluted lobes surrounding the primary gas stream. Secondary air is entrained by ejector action between the outside of the fluted lobes and the inside of the ejector shroud. The shape and size of the lobes are designed to convey the exhaust gases from their original cylindrical pattern into a larger annular region within the shroud for mixing with large quantities of ambient air drawn by ejector action into the shroud to create greater mass flow of the exit gas stream at reduced velocity.

U.S. Pat. No. 4,175,640 describes reduction of the maximum velocity of gases at the nozzle end of a turbofan engine by creation of a pattern of vortex flow of a mixed stream of primary and fan gases.

U.S. Pat. No. 3,667,680 describes an exhaust nozzle system for turbojet afterburning engines employing a two-stage, variable area ejector nozzle to maintain an approximately Mach 1.0 engine exhaust exit velocity.

U.S. Pat. No. 4,117,671 recognizes the difficulty of maintaining thrust by increasing the length of the mixing section of an ejector in a ducted-fan, turbojet engine due to frictional drag and other drag losses and seeks to minimize these losses by a mixing assembly wherein the bulk of the primary flow is gradually redirected to diverge radially outwardly and the bulk of the fan flow gradually redirected to converge radially inwardly.

U.S. Pat. No. 4,149,375 discloses an improved lobe-type mixer for a fan jet engine wherein the sidewalls are scalloped.

U.S. Pat. No. 4,137,992 describes inserting noise-absorbing structures within the nozzle of the engine to attenuate noise.

U.S. Pat. No. 3,954,224 discloses a retractable, multitube exhaust element having means for increasing the supply of ambient air thereto.

U.S. Pat. No. 4,165,609 discloses a flow mixer for a turbofan engine in which axially extending and circumferentially interspersed regions of the coaxially flowing fan stream and primary flow streams are caused to penetrate each other.

U.S. Pat. No. 4,077,206 discloses a "daisy wheel" type of tubular mixer of particular design for attenuating the core noise associated with turbine exhaust gases and the aft fan noise.

U.S. Pat. No. 3,065,818 discloses a jet noise suppressor nozzle having a plurality of hollow flow diverter members closed at their upstream ends and open at their downstream ends, with means for entraining atmospheric air into and through the interior of some of the flow diverters.

U.S. Pat. No. 3,721,314 discloses a plurality of scoop-like members movable into and out of the jet exhaust of a jet engine, the scoops designed to bleed off portions of the hot gas flow and secondary flow and discharge them to the ambient atmosphere.

U.S. Pat. No. 3,695,387 discloses a shroud for a turbofan jet engine in which circumferentially spaced ducts are pivotally mounted to swing into a position to partially block the rearwardly flow of exhaust gases and divert them radially outwardly into the fan airstream to promote intermixing of the primary and fan airstreams prior to their leaving the shroud.

U.S. Pat. No. 3,737,005 discloses an ejector nozzle wherein the inner walls of the ejector nozzle are formed of acoustical and structural honeycombed paneling perforated on the mixing zone side.

U.S. Pat. No. 3,749,316 discloses an ejector nozzle wherein jet nozzles are arranged around the walls of an ejector ring to discharge energized gas to form an axial peripheral jet stream to surround and accompany the mixed gases flowing out of the ring.

U.S. Pat. No. 3,820,630 discloses an ejector nozzle noise suppressor which causes the exhaust gases to overexpand in a cavity immediately on exit from the nozzle to produce a shock wave, causing the exhausted jet to become subsonic.

Some experimental work was carried out by the applicant on an ejector assembly designed to give a Mach 1.0 entrance condition for the secondary gas stream; however, there was no apparent reason observed, from the initial tests, why the primary and secondary gas streams would mix without a relatively long mixing section or zone.

There is no recognition in any of the patents cited of the design of an ejector nozzle having a mixing and diffusing section where secondary air is pulled into the mixing section at a velocity sufficiently high so that the mixed flow attains a sonic or choked condition in the mixing section, thereby rapidly mixing the secondary and primary gas flows at the exit end of the mixing section and substantially suppressing the jet noise without reduction of the thrust of the engine.

SUMMARY OF THE INVENTION

It is a primary object of this invention to provide a method of reducing jet engine noise at all frequencies with minimal loss of thrust (and possibly a gain) by employing an ejector assembly having a mixing zone into which a secondary gas stream is injected at a relatively high velocity.

It is a further object of this invention to provide an ejector assembly wherein the mixing section thereof has a length in the order of 0.5 to 1.0 times its diameter.

It is a further object of this invention to provide an ejector assembly and method wherein the velocity of secondary stream injected into the mixing zone of the ejector for mixing with the primary combustion gas stream from the jet engine is sufficiently high to result in rapid mixing of the primary and secondary gas streams in the mixing zone. This allows substantial reduction in the length of the mixing section of the ejector needed for adequate mixing of the two gas streams and makes the ejector practical for installation in jet aircraft.

It is a further object of this invention to provide an ejector assembly and method of operating such wherein a secondary gas stream is injected into and moves parallel with the primary combustion gas stream in a mixing zone downstream from the jet engine, the secondary gas stream injected into the primary gas stream in the mixing zone at a relatively high velocity so that the velocity of the mixed gas stream reaches a choked condition at the exit end of the mixing zone.

These and other objects are accomplished by directing a stream of high-velocity, primary combustion gases from the jet engine into a mixing zone downstream of the combustion zone of the engine, injecting into the primary stream in the mixing zone a secondary gas stream at a velocity sufficient to cause a choked flow condition of the mixture of primary and secondary gases at or near the exit end of the mixing zone, the choked flow condition resulting in rapid mixing of the primary and secondary air streams in the mixing zone, and pulling the primary and secondary air streams in the mixing section through a diffusion zone on the downsteam side of the mixing zone, the diffusion zone having an exit area in excess of that of the mixing zone. The ejector assembly, having a mixing zone and diffusion zone, is provided with means for adjusting the area of the mixing section and the amount of diffusion to match jet engine operating conditions.

BRIEF DESCRIPTION OF THE DRAWINGS

FIG. 1 is a schematic representation of a vertical cross-section of a turbofan jet engine employing an ejector system as described herein;

FIG. 2 is a schematic representation of a vertical cross-section of a turbojet engine without fan, employing an ejector system as described herein;

FIG. 2A is a schematic diagram of a basic ejector assembly illustrating the parameters of the ejector equation described herein;

FIG. 2B is a schematic diagram of an ejector assembly and diffuser for illustrating the parameters of the ejector equation;

DESCRIPTION OF THE PREFERRED EMBODIMENTS

Figure 3:
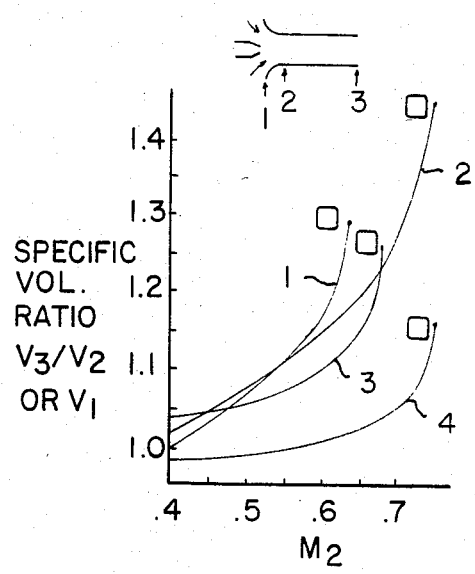
FIG. 3 is a somewhat fictitious graph, assuming no mixing of the primary and secondary gas streams, showing how the specific volume of the primary stream would increase in the mixing section as the secondary inlet Mach number, $M_2$, is increased to a point giving a Mach 1.0 or choked flow condition at the exit end of the mixing section, with several typical engine operating conditions shown.

Definitions:

Ejector—A constant momentum device where the momentum in a given mass of high-velocity gas is transferred to a second mass of slower moving or non-moving gas, with the resulting mixture having the same momentum as the original high-velocity gas stream.

Choked Flow Condition—a condition that results when the rate of change of the specific volume of the stream of gas divided by the velocity of the gas stream gives a minimum area beyond which the area must increase to maintain continuity of flow. As the area of a gas flowing in a stream tube is decreased, the velocity of the gas stream increases, while the static pressure and temperature of the gas stream drop. At the same time, the specific volume of the gas stream increases, more due to the drop in static pressure than it decreases due to the drop in temperature of the gas stream. A point is reached, thus, where the specific volume of the gas stream divided by the velocity equals a minimum area beyond which the specific volume changes faster than the increase in velocity of the gas stream can move the gas out of the way. When this condition is reached, i.e., where the weight flow of the gas flow through a nozzle cannot be increased by decreasing the downstream pressure, a "choked flow" condition occurs. To maintain continuity of flow beyond this point, the area of the gas stream must be increased so that the velocity of the gas stream multiplied by the larger area will equal the increased specific volume.

Mach Number=the ratio of the velocity of the fluid or gas stream over the speed of sound in the gas stream at that static temperature; or $$M = \frac{U}{\sqrt{\gamma g R T_s}},$$

where U equals the actual velocity of the gas stream, $\gamma$ equals the specific heat ratio, g equals the gravity constant, R equals the gas constant, and $T_s$ equals the static temperature of the gas in the gas stream.

The noise generated by the exhaust of a jet engine varies at the eighth power of the velocity of the ejected gas stream. Ejectors have been used as a method of reducing the velocity of those gases without losing the momentum or thrust thereof and thereby reducing the noise level of the exhaust gas stream. While it appears to be a simple problem to reduce the noise a desired amount by use of an ejector, in practical application the necessary length of the mixing section of the ejector to get adequate mixing and noise reduction has been on the order of five to ten times the equivalent diameter of the ejector. Such a long, cumbersome ejector cannot be mounted on the wings or in any other location on the aircraft in a practical manner For that reason, ejectors have not been widely employed on jet aircraft for reducing jet noise. If the length of the mixing section of the ejector could be reduced substantially beyond that which has been considered necessary, the ejector then becomes a means of reducing the noise of jet aircraft in an economical and practical way.

This invention is directed to a method for controlling jet engine noise employing an ejector designed for high-velocity secondary air inlet flow into the mixing zone for mixing with the primary gases so that the mixed gases reach a choked flow condition in the mixing zone, the choked flow condition for the mixed flow occurring before the secondary gas stream velocity reaches Mach 1.0. The quantity, pressure and temperature of the primary and secondary gases determine at what secondary entrance Mach number choking occurs for the mixed flow.

The basic equation for an ejector, referring to FIG. 2A, is:

$$W_1U_1 + W_2U_2 + P_{S2}A_2 = (W_1 + W_2)U_3 + P_{S3}A_3$$

where $W_1$ and $U_1$ equal the mass and velocity of the primary gas: $W_2$ and $U_2$ equal the mass and velocity of the secondary air; $P_{S2,3}$ equals the static pressure at stations along the length of the ejector, 2 being the entry of the ejector and 3 being the exit of the ejector; and $A_{2,3}$ equals the area at the points 2 and 3. In this ejector equation, the area of the ejector at the entrance is the same as the area at the exit, or $A_2 = A_3$. In practice, the $P_{S2}A_2$ and $P_{S3}A_3$ terms are very large and the velocity terms are small. The typical ejector pulls secondary air into the mixing section of the ejector by reduced pressure at the entrance to the mixing section. The velocity energy in the primary gas stream $W_1$ is transferred to the secondary air stream $W_2$ in the mixing section, thereby building up the static pressure within the mixing section until it reaches atmospheric pressure at the exit of the ejector. When a diffuser section is added to the exit of the mixing section, as in FIG. 2B, it causes a reduction in the static pressure at the exit end of the mixing section, which, in turn, reduces the static pressure at the entrance of the mixing section, thereby making it possible to get higher secondary inlet velocities. One of the major problems in the application of the ejector to sound suppression on aircraft has been the necessary length of the mixing section between the entrance and the exit thereof. Normally, this has needed to be between five and ten times the equivalent diameter of the mixing section in length, making the use of such ejectors impractical for aircraft installation.

It has been observed that there is a very rapid rate of change in the specific volume of both the primary and secondary gas streams in an ejector as a choked flow condition for the mixed primary and secondary gas stream is approached. This rapid rate of change in specific volume causes the gas streams to expand laterally as well as increase in velocity in a falling pressure field within the mixing zone. This phenomenon, combined with the natural tendency of the supersonic primary gas stream to go to a Mach 1.0 condition (due to friction) and the normal shock which occurs at the entrance end of the diffusion section, all combine to result in rapid mixing of the primary and secondary gas streams in a short length of mixing section for high incoming secondary gas stream velocities.

Figure 4:
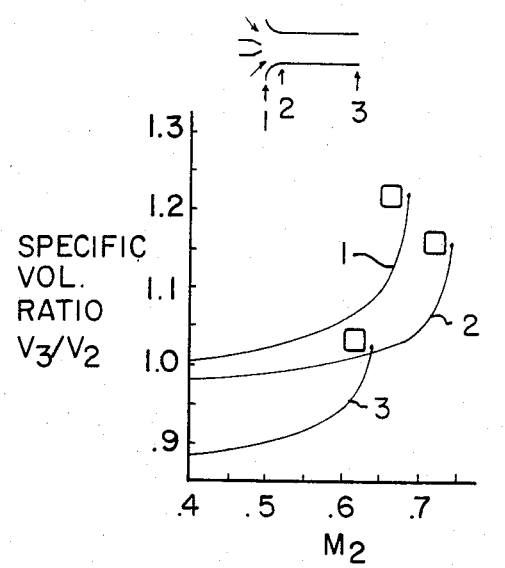
FIG. 4 is similar to FIG. 3 except that it shows what happens to the secondary stream as $M_2$ increases to give a choked flow condition for the mixture of the primary and secondary gas streams at the exit end of the mixing section.

FIGS. 3, 4, 5 and 6 illustrate graphically what happens under several different flow conditions typical of possible jet engine operating conditions. FIGS. 3 and 4 illustrate, somewhat fictitiously, how the specific volume of the primary and secondary gas streams increases in the mixing section as the inlet Mach number, $M_2$, is increased to a point giving a Mach 1.0 mixed condition.

The engine operating conditions assumed for FIG. 3 are:
Curve 1
  $W_3$—10#/s turbine gas @ 1660°R. 29.4 psia.
  $W_1$—10#/s ambient air @ 520°R. 14.7 psia.
Curve 2
  $W_3$—10#/s turbine gas @ 1660°R. 29.4 psia.
  $W_1$—50#/s fan air @ 600°R. 19.8 psia.
Curve 3
  $W_3$—10#/s turbine gas @ 1460°R. 20.0 psia.
  $W_2$—20#/s fan air @ 520°R. 16.8 psia.
Curve 4
  $W_3$—10#/s turbine gas @ 1660°R. 29.4 psia.
  $W_2$—50#/s fan air @ 600°R. 19.8 psia.

The engine operating conditions assumed for FIG. 4 are:
Curve 1
  $W_3$—10#/s turbine gas @ 1460°R. 20.0 psia.
  $W_2$—20#/s fan air @ 520°R. 16.8 psia.
Curve 2
  $W_3$—10#/s turbine gas @ 1660°R. 29.4 psia.
  $W_2$—50#/s fan air @ 600°R. 19.8 psia.
Curve 3
  $W_3$—10#/s turbine gas @ 1660°R. 29.4 psia.
  $W_2$—10#/s ambient air @ 520°R. 14.7 psia.

The purpose of FIGS. 3 and 4 was to study any natural tendency of the primary and secondary gas streams to mix in the mixing section as the inlet Mach number increased to a choked flow condition. The specific volume change, or tendency of the gas streams to expand laterlly as well as increase in velocity as the pressure drops, was considered the prime factor to cause rapid mixing. Curves 1 and 2 of FIG. 3 illustrate the ratio of the specific volume at the end of the mixing section (station 3) over the specific volume at the primary nozzle exit (station 1) plotted against the secondary inlet Mach number at station 2. In curves 3 and 4 of FIG. 3, the ratio of the specific volume at station 3 over that at station 2, rather than at the nozzle exit (station 1), was plotted. In all cases, as the choked flow condition is approached, a sharp rise in the specific volume ratio occurs, indicating a strong tendency for the gas to expand laterally. FIG. 4 illustrates a similar plot for the secondary flow. Again, a sharp rise in the specific volume ratio occurs as the choked flow condition is approached.

Figure 5:
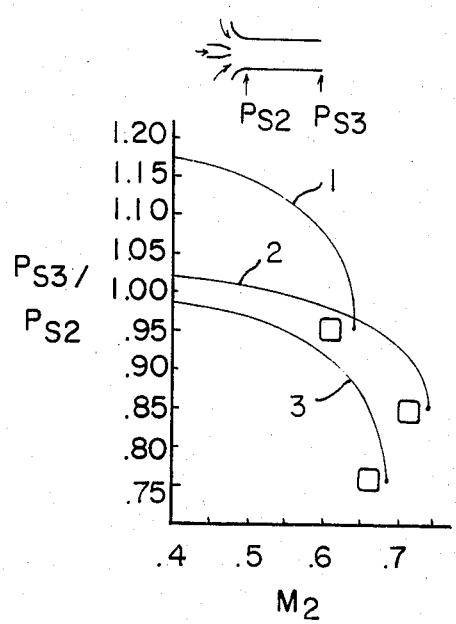
FIG. 5 is a plot of the pressure ratio of the static pressure at the exit end of the mixing section over the static pressure at the entrance of the mixing section plotted against the secondary inlet Mach number, $M_2$, for several typical engine conditions, indicating whether the static pressure is building or dropping in the mixing section.

FIG. 5 is a plot of the ratio of the static pressure at the end over that at the entrance of the mixing section versus the secondary inlet Mach number. There is a sharp drop in the ratio just before the choked flow condition, which indicates the pressure forces available for generating mixing are high. The conditions assumed for FIG. 5 are:
Curve 1
  $P_{s3}$—10#/s turbine gas @ 1660°R. 29.4 psia.
  $P_{s2}$—10#/s ambient air @ 520°R. 29.4 psia.
Curve 2
  $P_{s3}$—10#/s turbine gas @ 1660°R. 29.4 psia.
  $P_{s2}$—50#/s fan air @ 600°R. 19.8 psia.
Curve 3
  $P_{s3}$—10#/s turbine gas @ 1460°R. 20.0 psia.
  $P_{s2}$—20#/s fan air @ 520°R. 16.8 psia.

$P_{s3}$ is the static pressure at the exit end of the mixing zone and $P_{s2}$ is the static pressure at the entrance to the mixing zone. At a choked flow condition of the mixed gas stream, the secondary flow at the entrance to the mixing section is below Mach 1.0 while the primary gas flow at the entrance to the mixing zone may increase to a supersonic condition. Approaching a choked flow condition due to friction, both a subsonic and a supersonic stream normally tend to go to a sonic condition, thereby assisting in rapid mixing of the primary and secondary gas streams.

Figure 6:
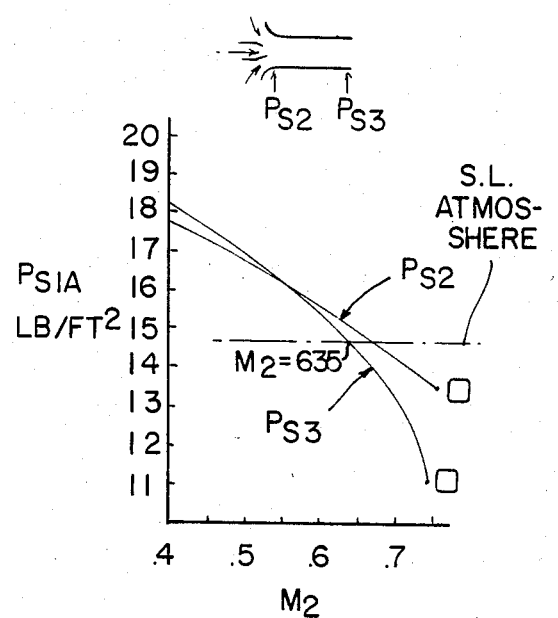
FIG. 6 is a plot of the absolute static pressure at the entrance and exit of the mixing section as the inlet Mach number, $M_2$, for a typical engine condition is changed, indicating the amount of pressure rise necessary in the diffuser section to make the ejector operate as it should.

FIG. 6 is a plot of the absolute static pressure at the entrance and exit of the mixing section as the inlet Mach number, $M_2$, is changed for an engine condition of 10#/s turbine gas @ 1660°R., 29.4 psia, and 50#/s fan air @ 600°R., 19.8 psia, and illustrates a buildup in static pressue in the mixing section up to about Mach 0.56. Thereafter, the static pressure decreases, resulting in a 2.55 psi sucking action in the mixing section at the choked condition. Up to $M_2=0.635$, a converging nozzle will be needed on the ejector. Beyond this point, a diffusing section will be required.

FIG. 1 illustrates a schematic representation of a vertical cross-section of a turbofan jet engine employing an ejector system of the type described. The primary gas stream 10 is discharged from a variable-sized area by movement of 10A into the mixing section 12 along with a secondary or fan airstream 14. A diffuser section 16 is secured to the exit end of the mixing section 12. The area of the mixing section 12 is preferably made variable by movement of 14A to accommodate the varying operating characteristics of jet engines to maintain a Mach 1.0 condition of the mixed gas stream in the mixing section. At a choked flow condition in the mixing zone, rapid mixing occurs because of the high rate of change of the specific volume. In this operating range, there is a strong tendency for the gas to expand laterally as well as increase in velocity due to a drop in static pressure. Normal shock occurs in the diffusing section. For best efficiency, the shock should occur close to the start of the diffusion section. The location of the normal shock is controlled by the amount of diffusion, which is varied by moving 16A.

FIG. 2 illustrates a turbojet without a fan wherein the primary gas stream 10 enters a mixing section 12 and ambient air is pulled into the mixing section 12 through opening 14. Again, a diffuser 16 is attached to the exit end of the mixing section. The diffuser can be varied in length by moving 16A to control the amount of diffusion and maintain the normal shock at or near the entrance of the diffusion section.

In utilizing an ejector system for noise suppression for jet engines, if the ejector is designed to have high secondary air inlet velocity so that a choked flow or Mach 1.0 condition exists at the end of the mixing section, it is possible to take advantage of the rapid change in the specific volume at close to a Mach 1.0 flow condition, as well as the normal shock, to accomplish rapid mixing of the primary and secondary gas streams. This reduces the needed length of mixing section to get good mixing and makes the ejector a practical system for use on aircraft. By reducing the exit velocity of the jet exhaust, it is possible to get a reduction in the noise level across the whole range of the noise frequency spectrum and not just a shift from one frequency range to another, as often occurs with noise-suppression devices. There is little or no loss, and possibly a gain, in thrust as, in the ejector, the momentum in a high-velocity stream is transferred into a larger mass moving at a lower velocity. There may actually be an opportunity to get a slight increase in thrust by increasing the velocity of slow moving air in the aircraft or around it in the ejector.

I claim:

1. A method for suppressing the noise of the exhaust of a jet engine at all frequencies with a minimum loss of thrust wherein the diameter of an ejector is selected for a particular jet engine such that the length of the mixing section or zone of the ejector is adequate for practical installation in jet aircraft, comprising:

providing a primary nozzle section delivering at least one jet of engine exhaust gases at a predetermined velocity, temperature and pressure into the mixing zone of the ejector, providing means to deliver a secondary gas stream at a predetermined velocity, temperature and pressure into the mixing zone of the ejector, selecting the diameter of the ejector in relation to its length to have a mixing section or zone length equal to about one diameter of the ejector and in relation to the predetermined velocities, temperatures and pressures of the primary and secondary gas flows to achieve a choked flow (Mach 1.0) condition of the mixture of primary and secondary gases at the end of the mixing zone, thereby utilizing the gas flow characteristics in the Mach 1.0 transistion to obtain rapid mixing of the primary and secondary gas flows in the mixing zone, and discharging the mixed gas stream into a diffusion zone downstream from the mixing zone having an expanding area section greater than that of the mixing zone, a normal shock occurring in the diffusion zone, with the location of the shock being at a point in the diffusion zone prior to when the gas mixture slows down in the expanding diffusion zone to where the mixed gas stream static pressure equals the ambient static pressure at the end of the diffusion zone.

2. The method of claim 1, including varying the area of the mixing zone to match engine flow variation and achieve a Mach 1.0 condition of the mixed gas stream within the mixing zone under engine flow variations.

3. The method of claim 1, including varying the amount of expansion of the mixed gas stream in the diffusion zone by changing the length of the diffusion zone.

* * * * *